E. Lynch.
Tanning Apparatus.
N° 88,764. Patented Apr. 6, 1869.

Witnesses.
Cornelius Coy
Leopold Earls

Inventor:
Edward Lynch
per
Alexander & Mason
Att'ys.

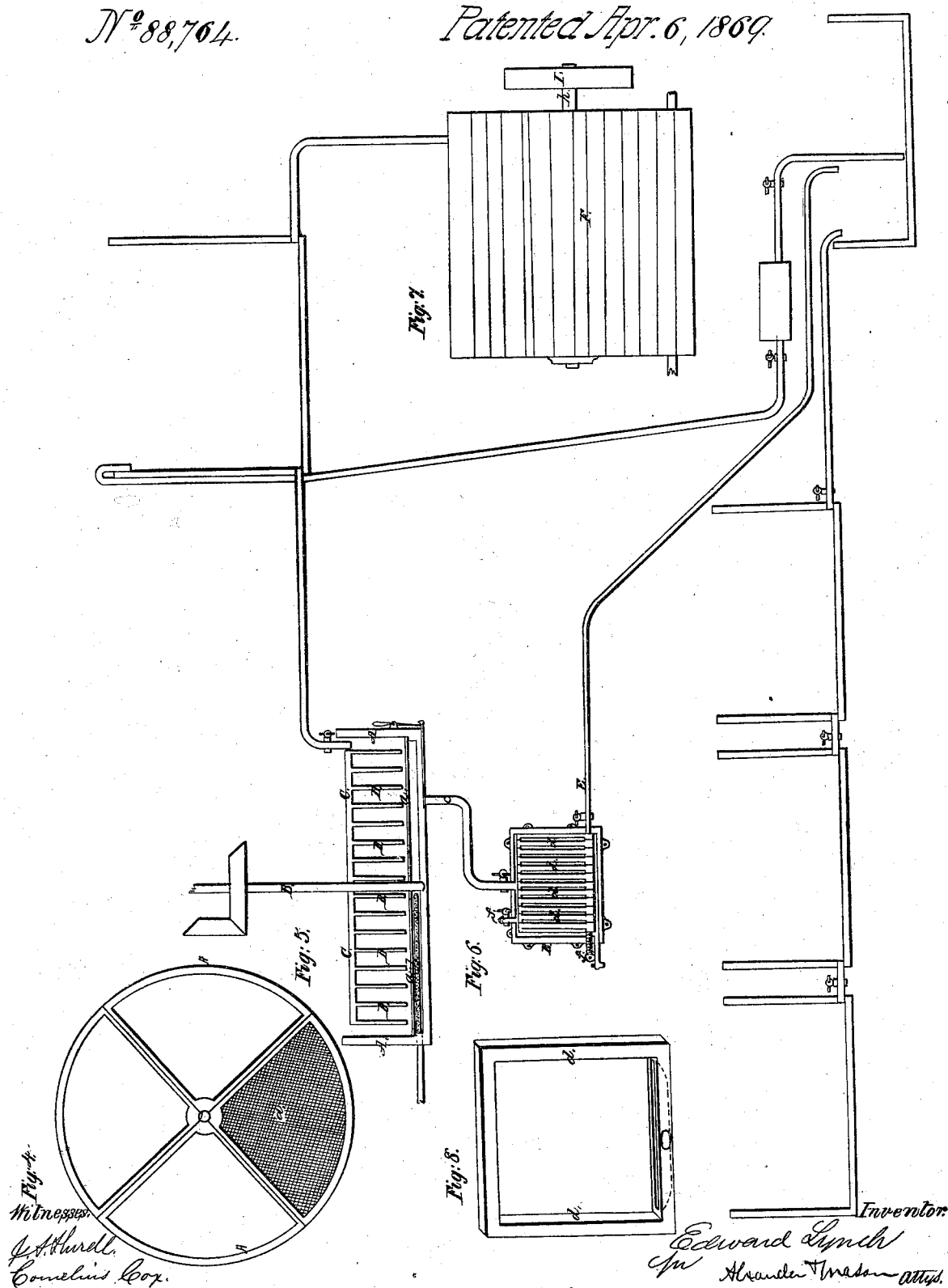

UNITED STATES PATENT OFFICE.

EDWARD LYNCH, OF GEORGETOWN, DISTRICT OF COLUMBIA.

Letters Patent No. 88,764, dated April 6, 1869.

IMPROVED PROCESS AND APPARATUS FOR TANNING.

The Schedule referred to in these Letters Patent and making part of the same.

*To all whom it may concern:*

Be it known that I, EDWARD LYNCH, of Georgetown, in the District of Columbia, have invented certain new and useful Improvements in Apparatus and Process for Tanning Hides; and do hereby declare that the following is a full, clear, and exact description thereof, reference being had to the accompanying drawings, and to the letters of reference marked thereon.

The nature of my invention consists in an apparatus and process for tanning hides by extracting the liquor from the bark, preparing the same thoroughly by filtration and fermentation, and revolving the hides in the liquor thus prepared.

In order to enable others skilled in the art to which my invention appertains, to make and use the same, I will now proceed to describe the construction and operation of my apparatus, as well as the process, referring to the annexed drawings, which form a part of this specification, and in which—

Figure 4 shows the bottom of the leach-tub.

Figure 5 is a longitudinal vertical section of the leach-tub.

Figure 6 is a longitudinal vertical section of the filter.

Figure 7 is another side view of the vat, the three last figures being connected, and showing the fermenting apparatus underneath.

Figure 8 is an enlarged view of the filter-frame.

Figure 1:
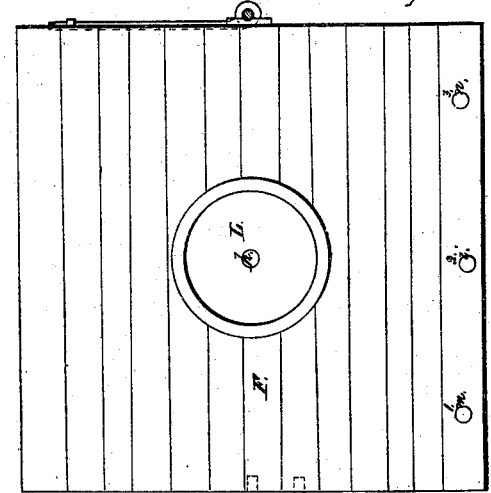
Figure 1 is a side elevation of the tanning-vat.

A represents the leach, or mash-tub, which is provided, a short distance above its bottom, with a fine screen, a, made in sections, so as to be easily removed, for the purpose of cleaning, &c.

Under this screen a pipe, b, is inserted, which pipe is provided with a number of small holes, through which steam is admitted into the tub, so as to heat the substances placed therein, to the necessary degree.

The pipe b should be provided with a stop-cock, so that the influx of steam may be easily regulated, and entirely shut off, at pleasure.

In the centre of the tub A is placed a vertical shaft, B, having suitable bearings at the top of or above the tub, and is provided, at a suitable height above the screen a, with a horizontal bar, C, having a series of perpendicular teeth, D D, extending downwards, to near the screen, forming a rake.

The upper end of the shaft B is to be provided with suitable gearing, so as to cause it, with its rake, to revolve in the tub A at suitable speed.

The bark to be used, is first ground about as fine as corn-meal, and bolted through a sieve, and sufficient water being placed in the tub A, and the rake C D revolving, the bark is poured in.

By the action of the steam on the mixture, and the continued agitation of the rake, the liquor is extracted from the bark.

It is well known that in the usual mode of extracting the liquor, the bark will clog, or gum, and, as in the old mode, the bark must be subjected to a considerable heat; the gum is also extracted, which is very injurious to the leather. But, by the use of the rake, it will not be necessary to heat the mixture to such a degree as will extract the gum, although, the bark being kept in continual motion, all the strength is taken from it.

As soon as the liquor has obtained the desired strength, it is drawn off by the pipe c, and passes into the filter E, hereinafter to be described.

A new supply of water is then poured on the old bark, which will give, in the same manner, a second but weaker quality of liquor; and, in this manner, I may keep on drawing off and filling up the tub, until all the strength has been extracted from the bark, when the tub is cleaned out, by removing the sectional screen, and a new supply of bark is put in to pass through the same process.

I will, however, here add that the second and subsequent liquors obtained from the first bark not being strong enough, I pass them through the next supply of bark, so as to bring them up to the necessary strength.

Although the liquor extracted from the bark in the tub A, passes through the screen a, there will still be sediment and dirt in the same, to avoid which I pass the liquor through a filter, E.

If the dirt, sediment, &c., were allowed to remain in the liquor, it would enter the pores of the leather and fill up the same, so that, when afterwards, the leather should become exposed to water, this dirt and sediment would soak out, and the leather be unfit for use. It is therefore of vital importance that this dirt and sediment be first removed before the liquor comes in contact with the hides.

The filter E, which I use for this purpose, consists of a box, of any suitable dimensions, the liquor entering the same through the pipe c, in the centre of its top.

Inside of this box is placed a series of perpendicular frames, d d, covered, or entirely enclosed in cloth, or other suitable filtering-material.

The lower, or bottom bars of these frames are grooved, as shown in fig. 8, and provided with holes through their centres.

The frames are, further, so constructed that, when placed together, the bottom bars would be close against each other, the holes mentioned, forming, as it were, a tube, while the sides of the frames are slightly separated.

The liquor now flowing into the box will filter through the cloth with which these frames are covered, and collect in the grooves in the bottom bars, while the dirt and sediment will collect between said frames.

The tube, formed through the centre of the bottom bars of the frames, leads out into the tube e, at one end of the box, so that the pure, clear liquor may pass into a receiver, or tank.

The frame at the opposite end of the box is, of course, not provided with a hole through the outer side, but closed, and the frames are all held together by a screw, f, pressing against this latter frame.

When all the liquor has passed through the filter, steam is forced into the box through the pipe g, which blows all the dirt and sediment out through a pipe, or opening on the side, at or near the bottom.

I may construct my filter with horizontal, or diagonal frames, instead of perpendicular, in which case, the necessary modifications for the outlet of the liquor will be made.

The liquor thus filtered, which is strong enough, I conduct into fermenting-tubs, and by the addition of malt-yeast, or other suitable material, answering the same purpose, I ferment the liquor, which is one of the most important features of my invention.

By fermenting the liquor, it is kept always sweet, and free from gallic-acid, and, at the same time, the liquor can be ready for use in about thirty hours, instead of waiting three or more months to extract in the old way.

Whatever material is used in fermenting the liquor, some substances will always remain, and for the purpose of removing these, I pass the fermented liquor again through a filter, similar to the filter E, above described.

Figure 3:
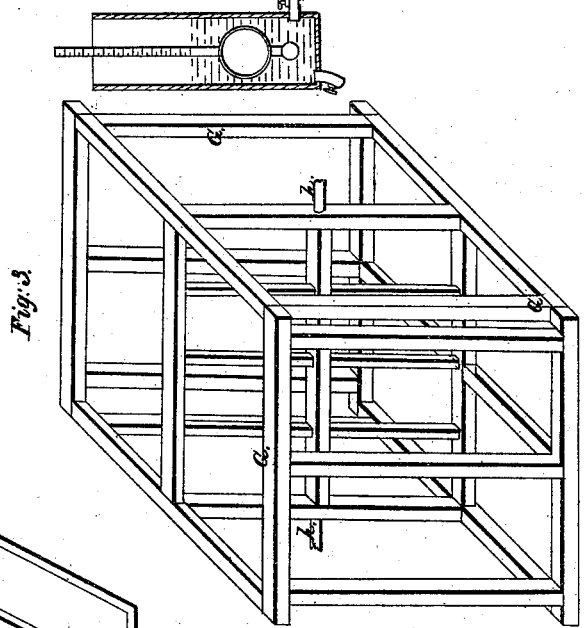
Figure 3 is a perspective view of the frame.
Figure 2:
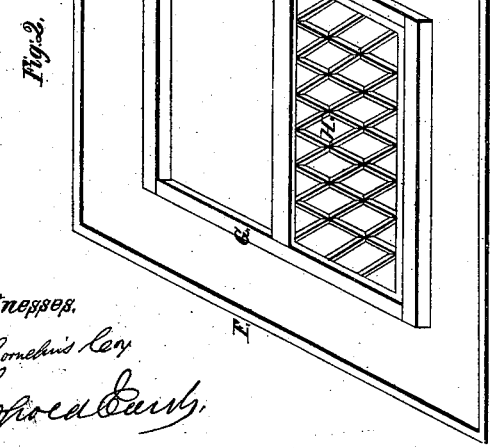
Figure 2 is a plan view of the same, showing the top of the frame for holding the hides.

The vat F, in which the hides are to be tanned, and which may be of any size and shape desired, is provided with a double frame, G, which hangs by a shaft, h, through the centre of the frame, in the sides of the vat. This frame is square, as represented in fig. 3, and the bars, on one side, I make loose, so as to be readily removed and put in at pleasure.

The bars on the centre shaft h divide the frame into two chambers, or depositories, hence, I have called it a double frame.

At the bottom of each chamber is placed a lattice, H. On this is spread one hide. On this hide are placed another lattice and another hide, and so on, until the whole frame is filled, alternately, with hides and lattices, when the loose cross-bars on top are put in, thus holding them all in the frame.

The shaft h is on the outside of the vat, provided with a pulley, I, around which is a belt, to communicate motion, to revolve the frame and hides as slow as possible.

When, now, the vat is filled with the liquor prepared as above described, and the frame revolves, the hides will, at all times, have a flat position against the body of the liquor.

It will be seen, that by the use of the lattices H H, sufficient space is allowed, between the hides in the frame, to allow a steady current of the tanning-fluid to pass through the hides at all times.

When the hides have revolved a suitable length of time in one direction, one side of them forcing the liquor ahead, I reverse the motion, and bring the other sides of the hides in contact with the liquor.

By this arrangement, the hides will take in the tannin much sooner than by lying dormant, in the old way of laying away. Besides, the liquor will be always the same strength in all parts of the vat, and I am enabled to see how the hides are tanning, and the gain in weight every day, which result has never been accomplished before.

As the hides take in, or absorb the strength from the liquor, I draw off a portion of the weakened liquor, through the pipe i, and fill up with strong, unused liquor; and so as to know when necessary to strengthen the liquor in this manner, I attach a barkometer to the side of the vat, and also, a thermometer, to indicate the heat of the liquor, as shown in red, in fig. 1.

Near the bottom of the vat, I pass a pipe, m, through the same, and, through this pipe, I let steam, or hot air pass, for the purpose of increasing the heat, and, also, another pipe, n, to allow a current of cold air or water to pass through, for the purpose of cooling the fluid in the vat. By these means, I am enabled to regulate the temperature of the liquor according to my own judgment.

When the hides have been tanned (the revolving-motion of the frame having been kept up constantly) I take the lattices out of the frame, so that the hides lie close together, and let the hides remain still in the frame (without revolving) submerged in the liquor for a sufficient length of time to plump the hides, and getting the wet into the same.

After this is completed, the liquor is entirely drawn off, and the hides taken out of the frame, when they are at once placed, in the same manner, in a similar frame, between lattices, and this frame is kept continually revolving, at a suitable speed, in the air, until thoroughly dried.

In the old process, the hides would invariably draw up, more or less, while, by my mode, of spreading out between lattices while drying, they cannot draw up, but remain even and smooth. Besides, revolving the frame with the hides, accelerates the drying-process to a considerable degree.

Having thus fully described my invention,

What I claim as new, and desire to secure by Letters Patent, is—

1. Extracting the liquor from bark by grinding it to a powder, and subjecting it, when so ground and mixed with water, to the action of steam while it is being violently agitated, substantially as and for the purposes herein set forth.

2. The tub A, constructed as described, with a screen, a, made in sections, and provided with a revolving-rake, C D, and steam-pipe b, all substantially as and for the purposes herein set forth.

3. Passing the liquor, extracted from bark, through a filter, for the purpose of removing all dirt and sediment from the same, substantially as herein set forth.

4. The filter E, constructed as described, of a box, having inlet-pipe c, outlet-pipe e, and steam-inlet and outlet, and enclosing a series of filtering-frames, substantially as and for the purposes herein set forth.

5. The frames d d, constructed as described, with grooves and apertures in their bottom bars, and each frame enclosed, or covered with cloth, or other suitable filtering-material, said frames being so arranged that, when placed close together, the apertures in their bottom bars will form a continuous tube, through which the filtered liquor may pass, substantially as herein set forth.

6. Fermenting the liquor extracted from bark, preparatory to using it, for the purpose of tanning hides, substantially as herein set forth.

7. The vat F, constructed as described, with outlet-pipe i, steam, or hot-air pipe m, and cold air or water-pipe n, substantially as and for the purposes herein set forth.

8. Regulating the temperature of the tanning-liquor by means of steam or water, hot or cold air, admitted into pipes running through the tanning-vat, substantially as herein set forth.

9. The double-revolving frame G, constructed as described, and provided with lattices H H, between which the hides are placed, substantially as and for the purposes herein set forth.

10. Placing hides between lattices, or their equivalents, in a revolving-frame, submerged in tanning-fluid, substantially as and for the purposes herein set forth.

11. Tanning hides by placing them in a frame, submerged in liquor extracted from bark, and revolving said frame and hides in the liquor, substantially as herein set forth.

12. Spreading tanned hides between lattices, or their equivalents, in a revolving-frame, exposed to the air, for the purpose of drying them, substantially as herein set forth.

13. The above-described process for tanning hides, substantially as set forth.

In testimony that I claim the foregoing, I have hereunto set my hand, this 22d day of March, 1869.

EDWARD LYNCH.

Witnesses:
JOHN C. COX,
O. KEMBEL.